US008392949B2

(12) United States Patent  
Miki et al.

(10) Patent No.: US 8,392,949 B2  
(45) Date of Patent: Mar. 5, 2013

(54) ELECTRONIC-PROGRAM-GUIDE RETRIEVAL METHOD AND ELECTRONIC-PROGRAM-GUIDE RETRIEVAL SYSTEM

(75) Inventors: Nanami Miki, Tokyo (JP); Tomoyuki Hanai, Kanagawa (JP)

(73) Assignee: Sony Corporation, Tokyo (JP)

(*) Notice: Subject to any disclaimer, the term of this patent is extended or adjusted under 35 U.S.C. 154(b) by 994 days.

(21) Appl. No.: 09/866,245

(22) Filed: May 25, 2001

(65) Prior Publication Data

US 2001/0048752 A1    Dec. 6, 2001

(30) Foreign Application Priority Data

May 29, 2000   (JP) ................................ P2000-158559

(51) Int. Cl.
G06F 3/00      (2006.01)
G06F 7/00      (2006.01)
(52) U.S. Cl. ........... 725/53; 707/706; 707/707; 707/708
(58) Field of Classification Search .................. 725/45, 725/53
See application file for complete search history.

(56) References Cited

U.S. PATENT DOCUMENTS

| | | | | |
|---|---|---|---|---|
| 5,278,980 A | * | 1/1994 | Pedersen et al. ................... 707/4 |
| 5,333,317 A | * | 7/1994 | Dann ................................. 1/1 |
| 5,404,507 A | | 4/1995 | Bohm et al. |
| 5,454,106 A | * | 9/1995 | Burns et al. ........................ 707/4 |
| 5,469,354 A | * | 11/1995 | Hatakeyama et al. ............. 707/3 |
| 5,488,725 A | * | 1/1996 | Turtle et al. ........................ 707/5 |
| 5,635,989 A | * | 6/1997 | Rothmuller ...................... 725/46 |
| 5,798,785 A | * | 8/1998 | Hendricks et al. ............... 725/46 |
| 5,956,711 A | | 9/1999 | Sullivan et al. |
| 5,966,637 A | * | 10/1999 | Kanungo et al. ............... 725/132 |
| 6,005,565 A | * | 12/1999 | Legall et al. ................... 715/721 |
| 6,005,631 A | | 12/1999 | Anderson et al. |
| 6,038,560 A | | 3/2000 | Wical |
| 6,133,909 A | * | 10/2000 | Schein et al. ................. 715/721 |
| 6,134,547 A | * | 10/2000 | Huxley et al. ......................... 1/1 |
| 6,392,640 B1 | * | 5/2002 | Will .............................. 345/184 |
| 6,393,443 B1 | * | 5/2002 | Rubin et al. ................... 715/236 |
| 6,438,752 B1 | * | 8/2002 | McClard ......................... 725/46 |
| 6,463,428 B1 | * | 10/2002 | Lee et al. ....................... 707/750 |
| 6,594,657 B1 | * | 7/2003 | Livowsky .............................. 1/1 |
| 6,598,039 B1 | * | 7/2003 | Livowsky ........................ 707/3 |
| 6,602,300 B2 | * | 8/2003 | Ushioda et al. ............... 715/264 |

(Continued)

FOREIGN PATENT DOCUMENTS

EP      0938053        8/1999
JP      5 23264        3/1993

(Continued)

*Primary Examiner* — Brian Pendleton
*Assistant Examiner* — Jason K Lin
(74) *Attorney, Agent, or Firm* — Frommer Lawrence & Haug LLP; William S. Frommer; Thomas F. Presson (57) ABSTRACT

An EPG retrieval system includes a data server, a client, and a dictionary database. The data server stores program information of an EPG. The client includes an access unit for accessing the data server, and an input unit for inputting a retrieval keyword for performing retrieval on the program information. The dictionary database stores retrieval keywords and keywords relevant to the retrieval keywords. The client inputs an arbitrary keyword, and extracts keywords relevant to the input keyword. The extracted keywords and the input keyword are used to perform retrieval on the program information.

13 Claims, 9 Drawing Sheets

U.S. PATENT DOCUMENTS

| | | | |
|---|---|---|---|
| 6,631,522 B1 * | 10/2003 | Erdelyi | 725/53 |
| 7,010,616 B2 * | 3/2006 | Carlson et al. | 715/236 |
| 7,165,098 B1 * | 1/2007 | Boyer et al. | 709/219 |
| 7,523,302 B1 * | 4/2009 | Brown et al. | 713/155 |
| 2003/0014753 A1 * | 1/2003 | Beach et al. | 725/53 |
| 2008/0275914 A1 * | 11/2008 | Boyer et al. | 707/104.1 |

FOREIGN PATENT DOCUMENTS

| | | |
|---|---|---|
| JP | 6-251076 | 9/1994 |
| JP | 8-171569 | 7/1996 |
| JP | 8 314952 | 11/1996 |
| JP | 10-3480 | 1/1998 |
| JP | 10-145451 | 5/1998 |
| JP | 10 149370 | 6/1998 |
| JP | 10-174062 | 6/1998 |
| JP | 10-210378 | 8/1998 |
| JP | 10-260985 | 9/1998 |
| JP | 11 66078 | 3/1999 |
| JP | 11-110406 | 4/1999 |
| JP | 2000 67074 | 3/2000 |
| JP | 2000-76735 | 3/2000 |

* cited by examiner

FIG. 4

EXAMPLE OF
DICTIONARY DATA

USER: THINKING ABOUT A TRAVEL
TO BRITAIN

ELECTRONIC-PROGRAM-GUIDE RETRIEVAL METHOD AND ELECTRONIC-PROGRAM-GUIDE RETRIEVAL SYSTEM

BACKGROUND OF THE INVENTION

1. Field of the Invention

The present invention relates to electronic-program-guide (EPG) retrieval methods and systems for retrieving program information from an EPG. More specifically, the present invention relates to an EPG retrieval method and an EPG retrieval system in which program information is retrieved from an EPG by extracting, from a database, keywords relevant to a retrieval keyword input by a client, and using the extracted keywords and the input retrieval keyword.

2. Description of the Related Art

Conventionally, when program information is retrieved using an EPG, a retrieval keyword is input by a user, and program information that completely corresponds to the retrieval keyword or program information that corresponds to words similar or relevant in meaning to the retrieval keyword is retrieved.

This retrieval keyword and the words similar or relevant to the retrieval keyword are keywords simply and mechanically determined by an EPG provider. Thus, the desired program information may not be retrieved using the user-input keyword. For example, retrieval using a person's name as a keyword has a problem in that an appropriate retrieval cannot be performed because commonly used names (only a family name, only a given name, a nickname, etc.) representing a person, a group to which a person belongs, etc., are not considered in a retrieval.

SUMMARY OF THE INVENTION

Accordingly, it is an object of the present invention to provide an EPG retrieval method and an EPG retrieval system in which the desired program information is retrieved by using keywords relevant to a retrieval keyword input by a user to access program information stored in an EPG database.

To this end, according to an aspect of the present invention, the foregoing object is achieved through provision of an electronic-program-guide retrieval method including the steps of, when retrieval based on an input retrieval keyword is performed by accessing an electronic-program-guide database storing electronic-program-guide data, extracting relevant-keyword information relevant to the input retrieval keyword from a dictionary database, and extracting necessary electronic-program-guide data based on the extracted relevant-keyword information from the electronic-program-guide data stored in the electronic-program-guide database.

Preferably, the dictionary database stores words to be used as retrieval keywords, and relevant keywords relevant to the words to be used as retrieval keywords.

When the retrieval keyword is the name of a person, the relevant-keyword information may be one of or a combination of a nickname of the person, the full name of the person, the given name of the person, the name of a group relevant to the person, and another well-known name of the person.

When the retrieval keyword is a word written in hiragana characters and/or katakana characters used in Japanese writing, the relevant-keyword information includes a word written in kanji characters used in Japanese writing or in characters relevant to the kanji characters.

When the retrieval keyword corresponds to one of misused character keywords stored in a misused keyword database which are caused by possible input mistakes, only the relevant-keyword information may be used to perform retrieval.

The retrieval keyword and the relevant-keyword information may be interrelated to each other.

When part of a word to be used as the retrieval keyword is input, the word to be used as the retrieval keyword and the relevant-keyword information may be extracted from a retrieval-keyword database storing previously input keywords in a predetermined order.

When the retrieval keyword belongs to a particular genre, the relevant-keyword information may belong to a genre different from the particular genre.

When the particular genre is relevant to cooking, the different genre may be relevant to cooks.

When the particular genre is relevant to place names, the different genre may be relevant to one of or a combination of neighboring city names, country names, and regional names.

According to another aspect of the present invention, the foregoing object is achieved through provision of an electronic-program-guide retrieval system including a data server including an electronic-program-guide database storing program information of an electronic program guide, a client including access means for accessing the electronic-program-guide database and input means for inputting a retrieval keyword for retrieving the program information, and a dictionary database for storing retrieval keywords and relevant keywords relevant to the retrieval keywords. Relevant-keyword information relevant to the retrieval keyword input by the client is extracted from the dictionary database, and retrieval by accessing the program information is performed based on the extracted relevant-keyword information and the input retrieval keyword.

Preferably, the dictionary database is provided at the client side.

The dictionary database may be provided at the data server side.

The client may download and store the program information.

The client may access a necessary part of the data server via a routing server storing information on routes to the parts of the data server.

The dictionary database may store misused keywords caused by possible input mistakes, and when the input keyword corresponds to one of the misused keywords, only the relevant-keyword information may be used to perform retrieval.

When the retrieval keyword is a word written in hiragana characters and/or katakana characters used in Japanese writing, the relevant-keyword information includes a word written in kanji characters used in Japanese writing or in characters relevant to the kanji characters.

The dictionary database may store previously input keywords so that the input keywords are included in the relevant-keyword information, and the stored keywords are arranged in order of frequency of use.

The program information may include data relevant to movie information.

The program information may include data relevant to drama information.

The program information may include data relevant to place names.

The program information may include data relevant to the names of dishes.

According to the present invention, by extracting relevant-keyword information relevant to an input retrieval keyword, and performing retrieval using the extracted relevant-keyword information and the input retrieval keyword, the speed of the retrieval is increased because electronic program guide data that is not relevant is not retrieved. In addition, retrieval is performed by using the input retrieval keyword and electronic program guide data, the desired electronic program guide data can be efficiently retrieved, whereby efficient retrieval can be performed. Moreover, by adding, to the electronic program guide data, information such as movie information, and drama information, information having high added value can be provided. A dictionary database may be provided either at the data server side or at the client side. Accordingly, the dictionary database can be provided in accordance with environment for use.

DESCRIPTION OF THE PREFERRED EMBODIMENTS

EPG retrieval methods and systems according to embodiments of the present invention are described below with reference to the accompanying drawings.

Figure 1:
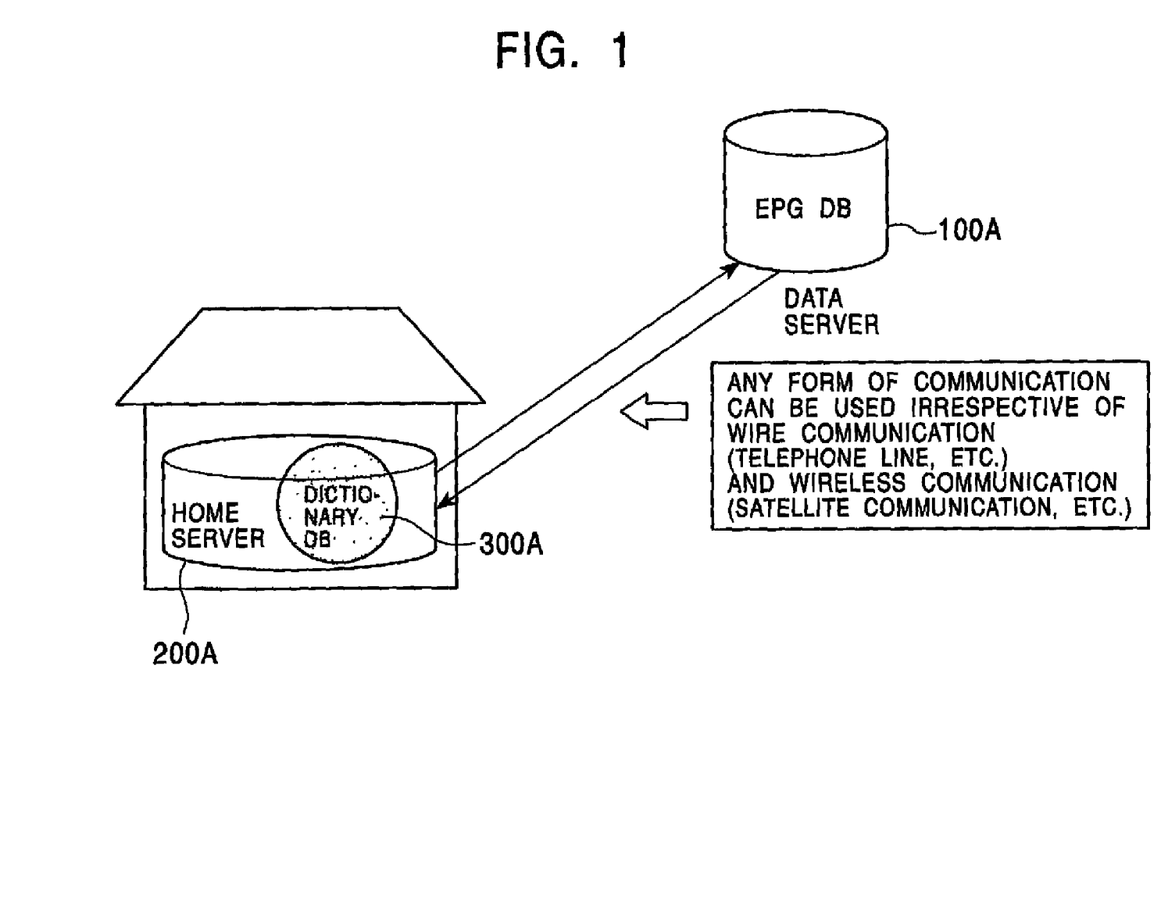
FIG. 1 is a drawing showing the structure of an EPG retrieval system according to a first embodiment of the present invention.

Referring to FIG. 1, an EPG retrieval system according to a first embodiment of the present invention includes a data server 100A (indicated by "EPG DB") storing EPG data, and a home server 200A including an access unit (not shown) for accessing the data server 10A, an input unit (not shown) for inputting a retrieval keyword for performing retrieval on the EPG data, and a dictionary database (indicated by "DICTIONARY DB") 300A storing retrieval keywords and keywords relevant to the retrieval keywords.

A case using the above EPG retrieval system to retrieve EPG data is described below.

Figure 2:
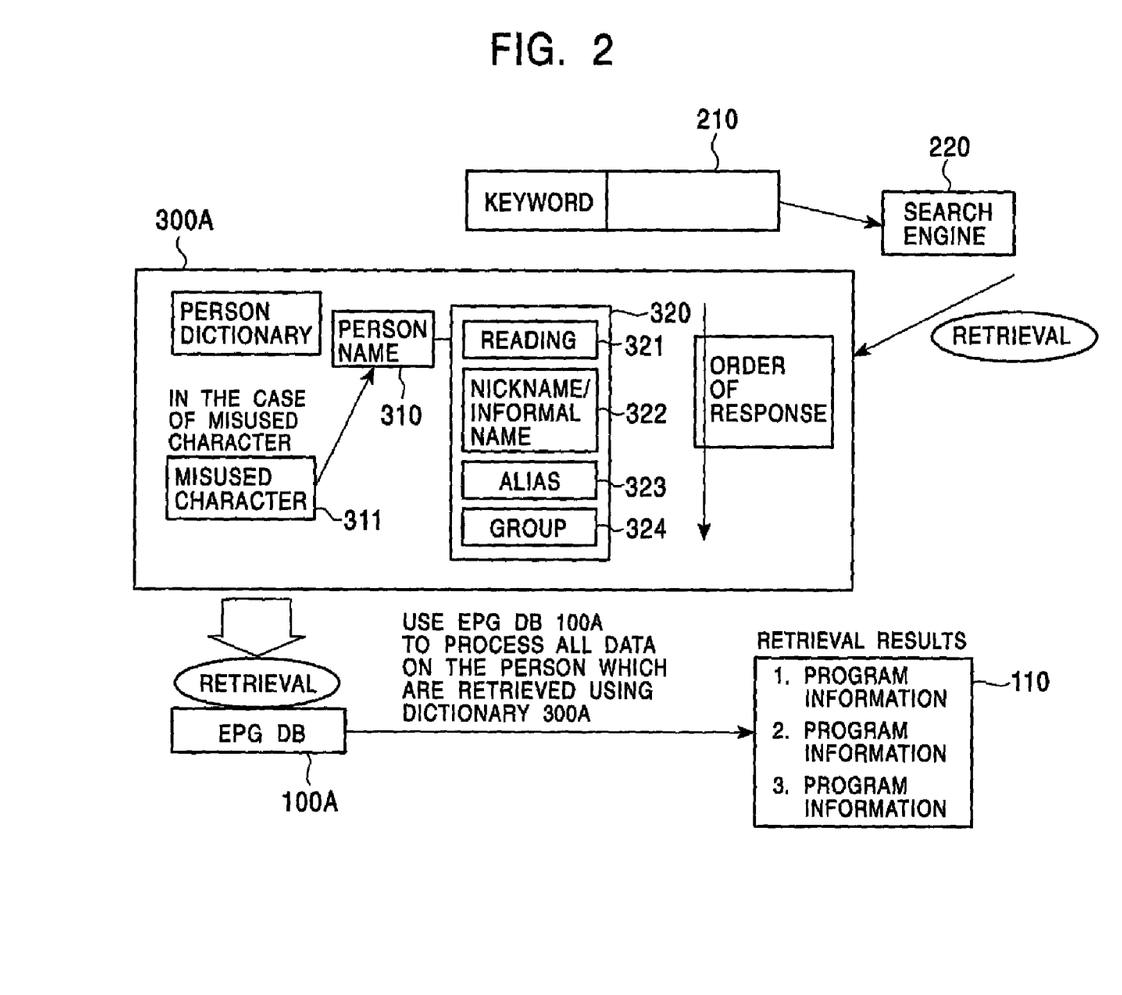
FIG. 2 is a drawing showing an example of the dictionary database 300A shown in FIG. 1 in a case in which the EPG retrieval system shown in FIG. 1 retrieves a person's name.

As shown in FIG. 2, a retrieval keyword 210 for retrieving the desired EPG data is input from a terminal (not shown) linked to the home server 200A (FIG. 1). The input retrieval keyword 210 is transferred to the dictionary database 300A via the search engine 220 as the input unit.

When receiving the retrieval keyword 210, the dictionary database 300A extracts keywords relevant to the retrieval keyword 210. For example, when the input retrieval keyword 210 is the name of a person, the dictionary database 300A refers to a person dictionary, and extracts, as relevant keywords 320 relevant to a person's name 310 corresponding to the retrieval keyword 210, a reading 321 of the person's name 310, a nickname/informal name 322 such as a widely known name, an alias 323, and a group 324 to which the person belongs. Full names, etc., are likely to be input using misused kanji characters. Accordingly, by storing, in advance, frequently misinput characters, etc., as possible misused characters 311 in the dictionary database 300A, the relevant keywords may be extracted after replacing an improper full name by the person's name 310 as a correct name.

The extracted relevant keywords 320 and the input retrieval keyword 210 are used to retrieve the desired program information 110 from the EPG data in the data server 100A (FIG. 1). In addition to the relevant keywords 320, by storing previously used retrieval keywords, and arranging the stored keywords in order of frequency of use, the retrieval speed may be increased.

Figure 3:
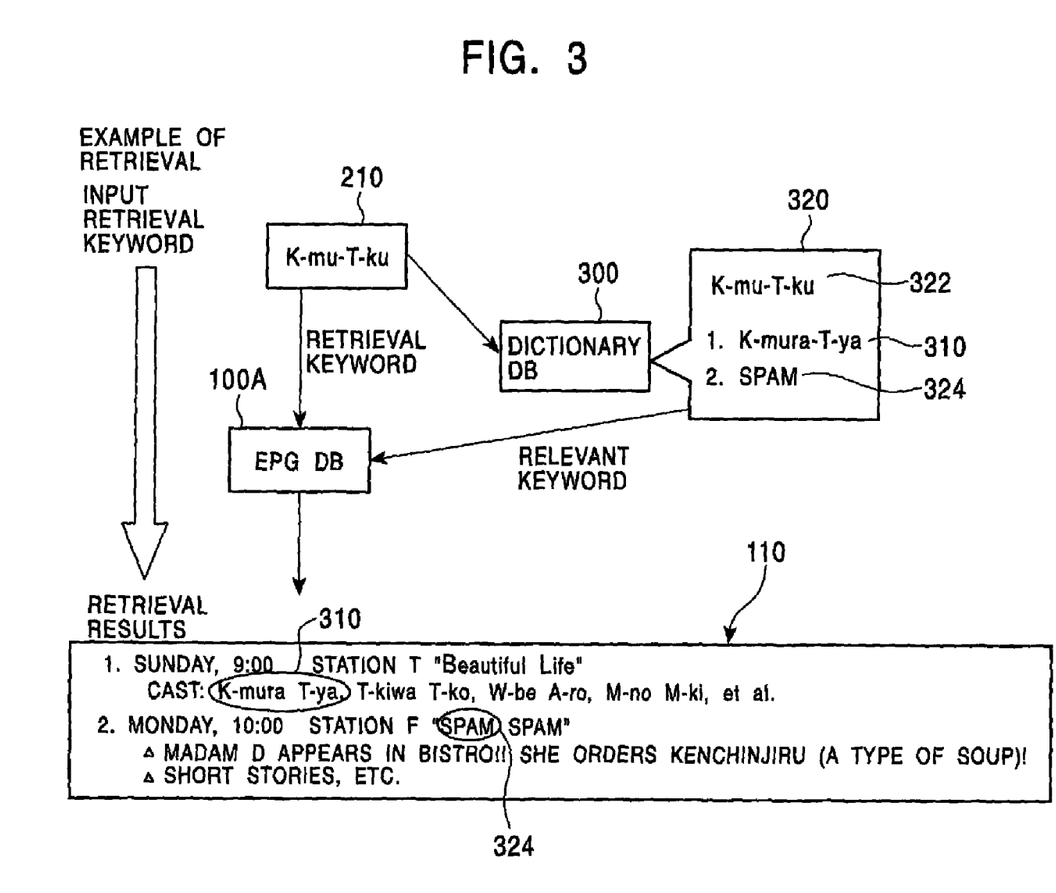
FIG. 3 is a drawing showing the concept of a case in which the EPG retrieval system shown in FIG. 1 performs retrieval using a person's name as a retrieval keyword.

With reference to FIG. 3, a specific example is described below.

First, "K-mu-T-ku" is input as a retrieval keyword 210. Based on this retrieval keyword, the dictionary database 300A extracts, as relevant keywords 320, "K-mura-T-ya" as a correct person's name 310 which is relevant to "K-mu-T-ku" as a nickname/informal name 322, "Kemuratekuya" as a reading corresponding to the reading 321 (FIG. 2), "SPAM" as a group 323 to which the person belongs, etc. If the input retrieval keyword 210 is a word corresponding to the misused characters 311 (FIG. 2), the retrieval keyword 210 is corrected, and the relevant keywords 320 are extracted.

By using the extracted relevant keywords 320 and the retrieval keyword 210 to perform retrieval on the EPG data in the data server 100A, "K-mura-T-ya" as the person's name 310, and program information 110 relevant to "SPAM" as the group 324 are retrieved as the relevant keywords 320. If the input retrieval keyword 210 is a word including a misused character, the retrieval keyword 210 is not used, and the relevant keywords 320 are used to perform the retrieval alone.

Figure 4:
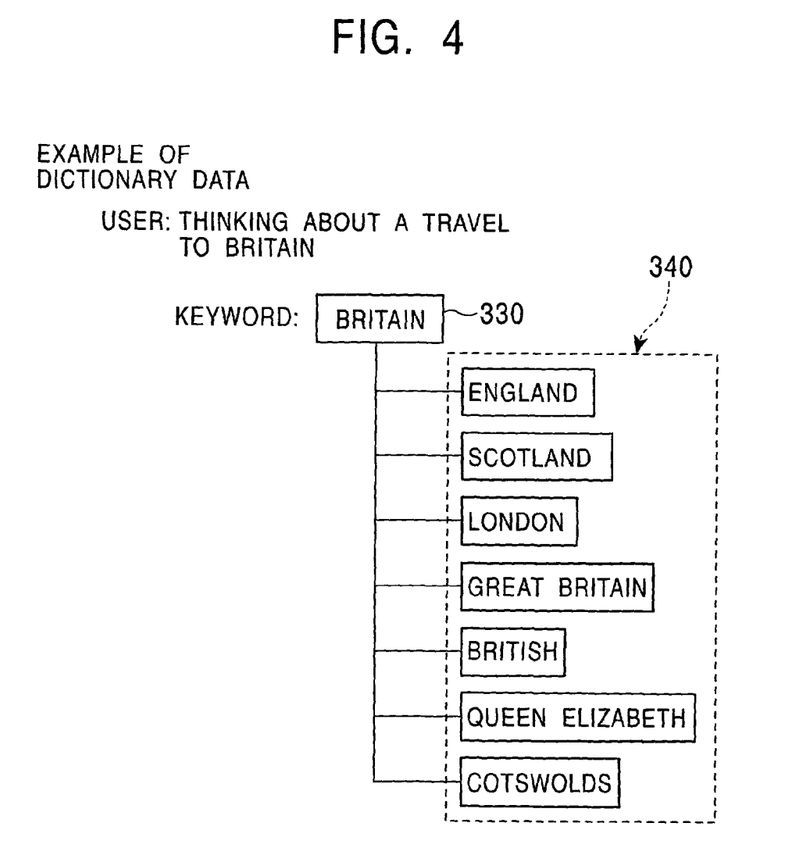
FIG. 4 is a drawing showing an example of the dictionary database 300A shown in FIG. 1 in a case in which the EPG retrieval system shown in FIG. 1 retrieves a place name.

The above names are so interrelated that when "SPAM" as the group 324 is used as the retrieval keyword 210, "K-mura-T-ya" as the person's name 310, "Kemuratekuya" as the reading 321, and "K-mu-T-ku" as the nickname/informal name 322 are extracted as the relevant keywords 320. In addition, in a case of the retrieval using a retrieval keyword 330 relevant to a country name, as shown in FIG. 4, relevant regional names and person's names may be stored as relevant keywords 340, and a genre relevant to the names of dishes special to a region may be additionally stored. Obviously, the relevant keywords 340 are interrelated to one another.

Figure 5:
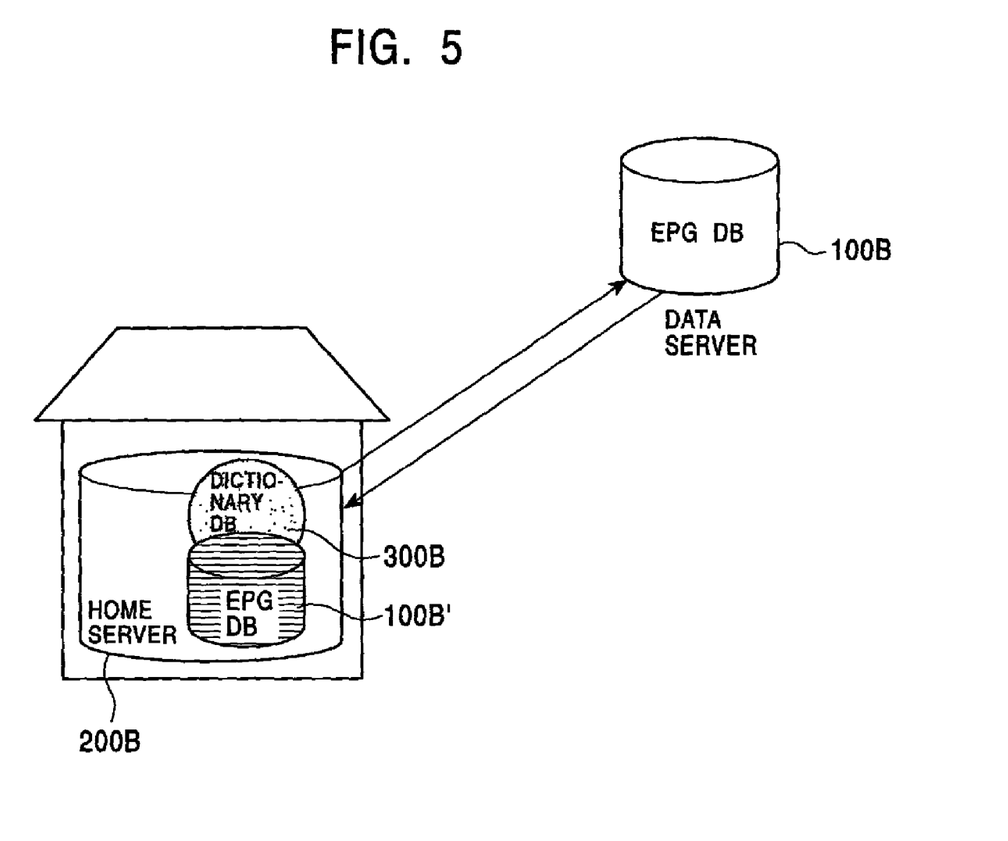
FIG. 5 is a drawing showing the structure of an EPG retrieval system according to a second embodiment of the present invention.

Referring to FIG. 5, an EPG retrieval system according to a second embodiment of the present invention includes a data server 100B (indicated by "EPG DB) storing EPG data, and a home server 200B including an access unit for accessing the data server 100B, an input unit for inputting a retrieval keyword for performing retrieval on the EPG data, a dictionary database 300B storing retrieval keywords and keywords relevant to the retrieval keywords, and an EPG database (indicated by "EPG DB") 100B' for downloading and storing the EPG data from the data server 100B.

When the EPG retrieval system according to the second embodiment performs retrieval on the EPG data, by downloading the EPG data from the data server 100B and storing the downloaded data in the EPG database 100B' of the home server 200B, the desired program information is retrieved from the EPG data. By downloading the EPG data from the data server 100B, as required, so that the data of the EPG database 100B' can be updated, high speed retrieval can be performed without accessing the data server 100B each time.

Figure 6:
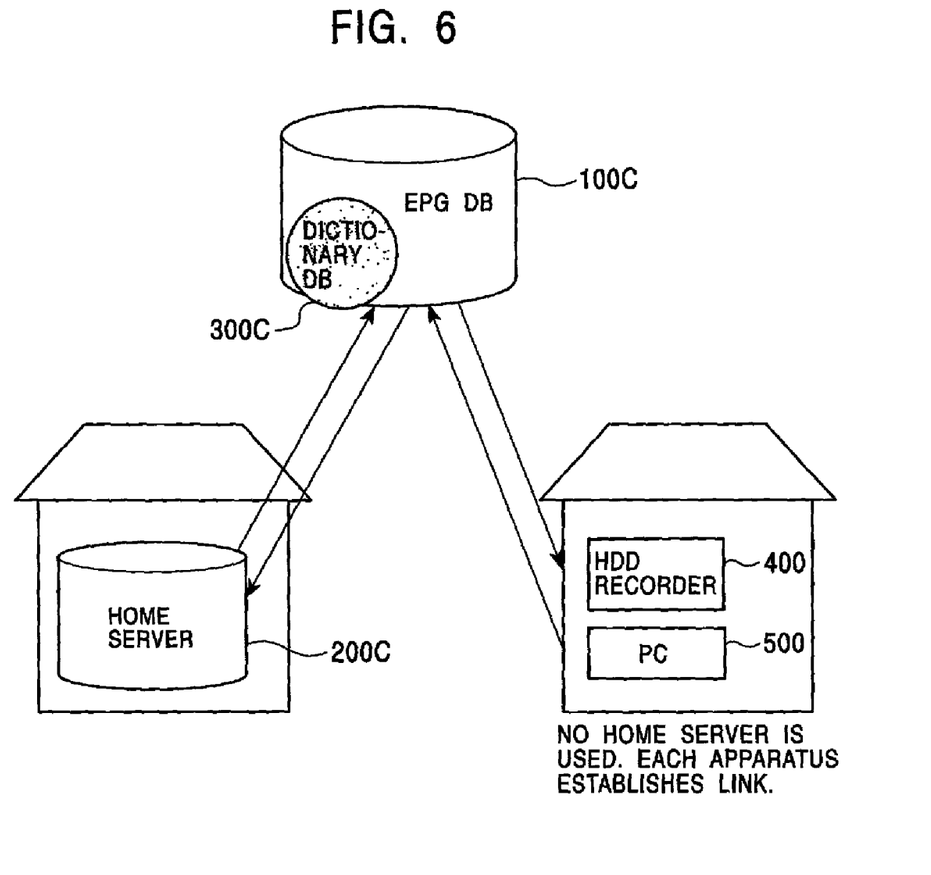
FIG. 6 is a drawing showing the structure of an EPG retrieval system according to a third embodiment of the present invention.

Referring to FIG. 6, an EPG retrieval system according to a third embodiment of the present invention includes a data server 100C that stores EPG data and that includes a dictionary database 300C storing retrieval keywords and keywords relevant to the retrieval keywords, a home server 200C including an access unit for accessing the data server 100C and an input unit for inputting a retrieval keyword for performing retrieval on the EPG data, and an hard disk drive (HDD) recorder 400 or a personal computer (PC) 500, which includes an access unit for accessing the data server 100C and an input unit for inputting a retrieval keyword for performing retrieval on the EPG data.

When the EPG retrieval system according to the third embodiment performs retrieval on the EPG data, a retrieval keyword, input from the home server 200C, the HDD recorder 400, or the PC 500, is sent to the data server 100C, retrieval on the EPG data is performed using relevant keywords extracted from the dictionary database 300C in the data server 100C, and the result of the retrieval is received by the home server 200C, the HDD recorder 400, or the PC 500. As described above, by providing the dictionary database 300C on the side of the data server 100C, the dictionary database 300C can be used in common. Accordingly, in a client having a small data storage capacity in a device such as the home server 200C, the HDD recorder 400, or the PC 500, the storage capacity is not occupied by the dictionary database 300C, so that if the contents of the dictionary database 300C are updated, maintenance of difference data does not need to be performed.

Figure 7:
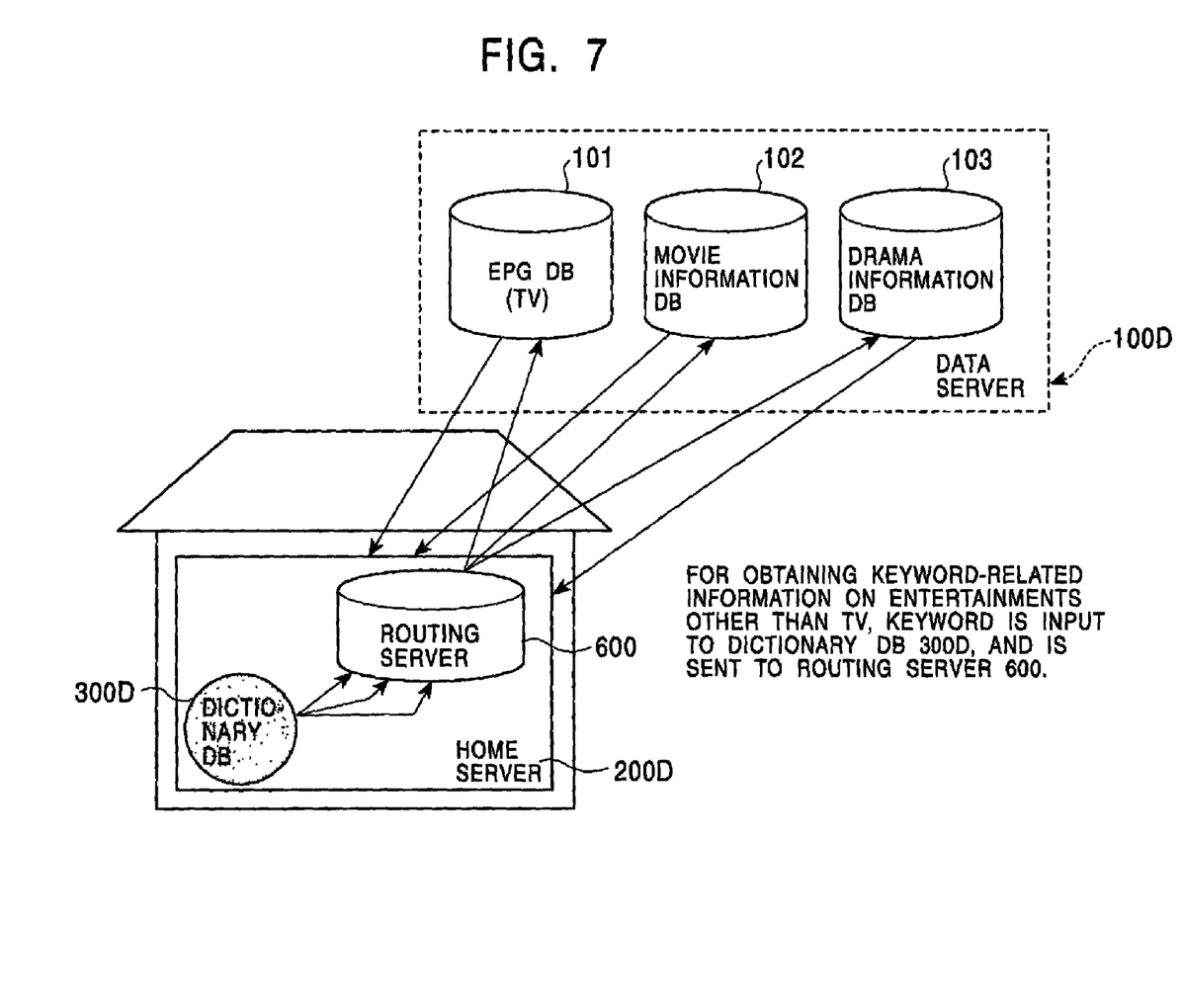
FIG. 7 is a drawing showing the structure of an EPG retrieval system according to a fourth embodiment of the present invention.

Referring to FIG. 7, an EPG retrieval system according to a fourth embodiment of the present invention includes a data server 100D including an EPG database 101 for storing EPG data, a movie information database 102 for storing movie information, and a drama information database 103 for storing drama information, and a home server 200D including an input unit (not shown) for inputting a retrieval keyword for performing retrieval on the EPG data, a dictionary database 300D storing retrieval keywords and keywords relevant to the retrieval keywords, and a routing server 600 which has information on paths to the databases 101 to 103 and which has an access unit for accessing the databases 101 to 103.

In a case in which the EPG retrieval system according to the fourth embodiment performs retrieval, when a retrieval keyword is input, the dictionary database 300D extracts and sends relevant keywords to the routing server 600, the routing server 600 accesses one of the databases 101 to 103 in the data server 100D which has the desired data by selecting a route to the database, and the desired data is obtained from the database. The EPG database 101, the movie information database 102, and the drama information database 103 may be provided in separate data servers for distributed arrangements at different locations.

Figure 8:
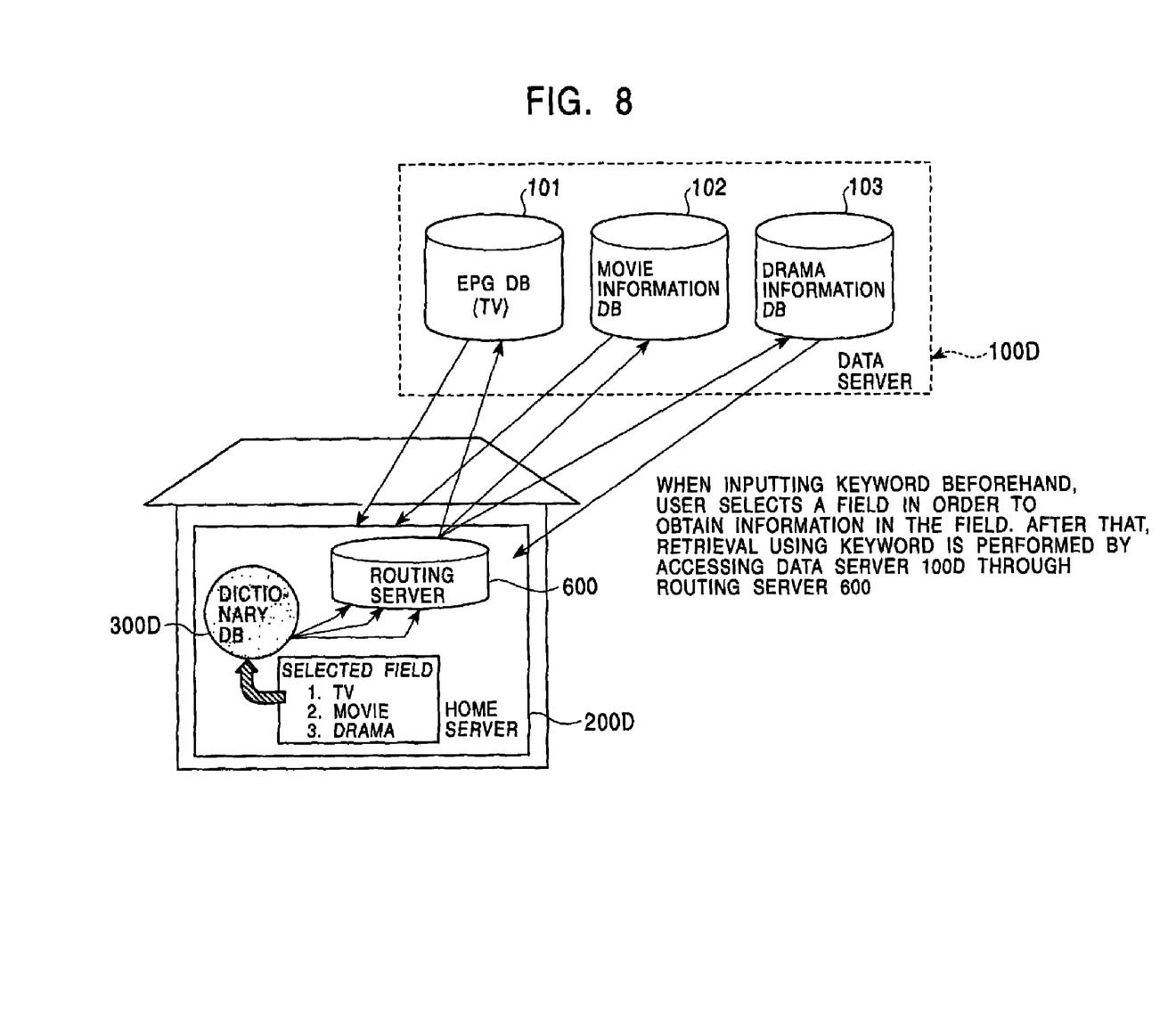
FIG. 8 is a drawing briefly showing a construction in which the EPG retrieval system shown in FIG. 7 performs retrieval after selecting a database having the desired data.

Referring to FIG. 8, in the EPG retrieval system according to the fourth embodiment, when retrieval keyword is input, a particular database is designated beforehand from among the EPG database 101, the movie information database 102, and the drama information database 103. Relevant keywords are extracted by the dictionary database 300D, and are sent to the routing server 600. The routing server 600 access the designated database by selecting a route to the designated database, whereby the desired data is obtained.

Figure 9:
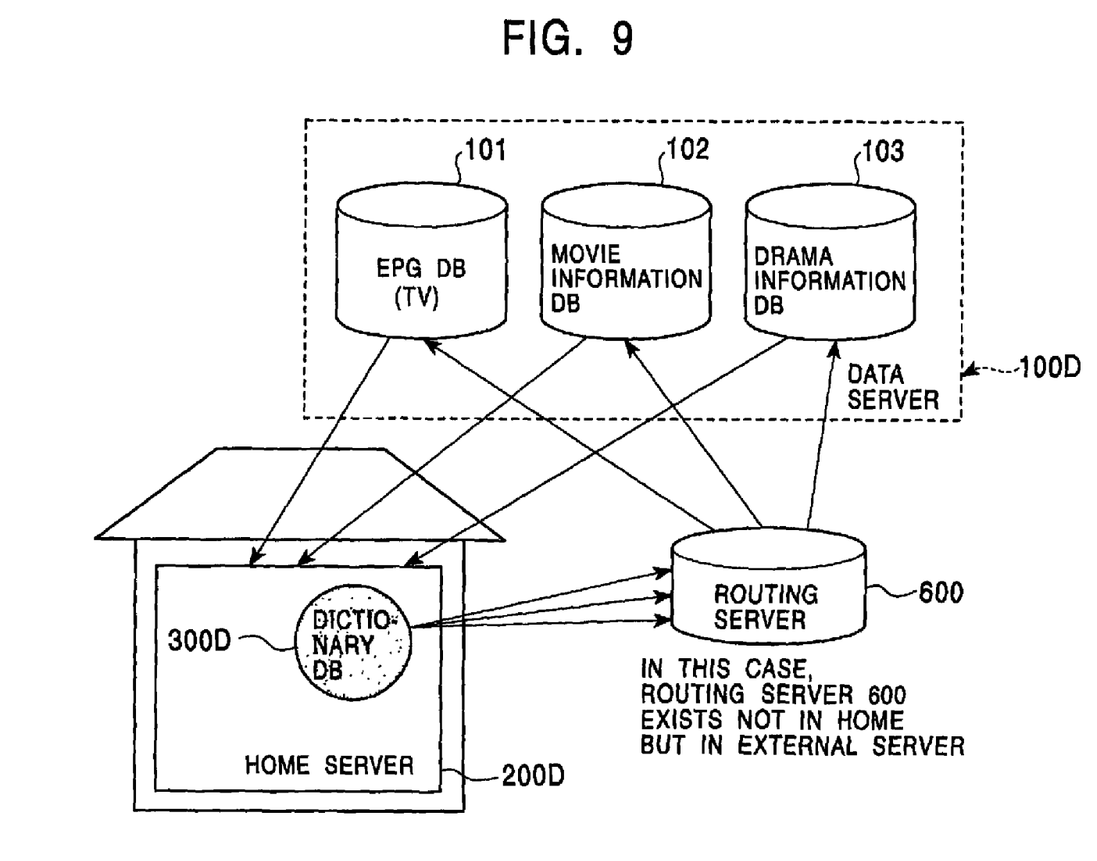
FIG. 9 is a drawing showing a construction in which the EPG retrieval system shown in FIG. 7, the routing server 600 is provided outside the home server 200D.

FIG. 9 shows a case in which in the EPG retrieval system according to the fourth embodiment, the routing server 600 which has information on the paths to the databases 101 to 103 and which has the access unit for accessing the databases 101 to 103 is provided outside the home server 200D. When a retrieval keyword is input, relevant keywords, extracted by the dictionary database 300D, are sent to the routing server 600, the routing server 600 accesses one of the databases 101 to 103 in the data server 100D which has the desired data by selecting a route to the data server, whereby the desired data is obtained. By employing this construction, the home server 200D itself does not need to have the route information, whereby the storage capacity can be saved, and inconvenience of maintenance can be eliminated.

What is claimed is:

1. An electronic-program-guide retrieval method comprising the steps of:

receiving an input retrieval keyword;

accessing a dictionary database based on an input retrieval keyword, wherein the dictionary database is stored in a data server whereby, by providing the dictionary database in the data server, the dictionary database is used in common, and accordingly, in a client having a small data storage capacity in a home server, a HDD recorder 400, or a PC, storage capacity is not occupied by the dictionary database, and wherein when contents of the dictionary database are updated, maintenance of difference data does not need to be performed by the home server;

extracting at least one additional keyword from a dictionary database as a function of the input retrieval keyword, wherein, when the input retrieval keyword is received in the receiving step, the at least one additional keyword is extracted from the dictionary database as a function of the input retrieval keyword in the extracting step, and wherein the dictionary database stores frequently misspelled words as possible misspelled words, and wherein the at least one additional keyword may be extracted after replacing an improperly input keyword with a corrected keyword based on the stored frequently misspelled words, wherein relevant keywords and previously used retrieval keywords are arranged in order of frequency of use increasing retrieval speed, wherein when the input retrieval keyword is the name of a person, the dictionary database refers to a person dictionary, and extracts, as relevant keywords a reading of the person's name, a nickname or informal name, an alias, and a group to which the person belongs; and pre-designating one particular database from among a plurality of databases, including an electronic-program-guide database, a movie information database, and a drama information database, wherein each of the plurality of databases are provided in separate data servers for distributed arrangements at different locations;

selecting a route to the one particular database via a routing server comprising: a storage unit for storing information on a path to each of the plurality of databases; and an access unit for accessing each of the plurality of databases;

searching electronic-program-guide data from the particular database that is pre-designated as a function of the input retrieval keyword and the at least one extracted additional keyword, wherein, when the input retrieval keyword is input, relevant keywords, extracted by the dictionary database are sent to the routing server, and wherein the routing server accesses one of the databases in a data server storing the particular database, storing desired data by selecting a route to the data server, whereby the desired data is obtained.

2. An electronic-program-guide retrieval method according to claim 1, wherein the input retrieval keyword and the at least one extracted additional keyword are interrelated to each other.

3. An electronic-program-guide retrieval method according to claim 1, wherein when part of a word to be used as the input retrieval keyword is input, said word to be used as the input retrieval keyword and the at least one extracted additional keyword are extracted from a retrieval-keyword database storing previously input keywords in a predetermined order.

4. An electronic-program-guide retrieval method according to claim 1, wherein when a particular genre is relevant to cooking, a different genre is relevant to cooks.

5. An electronic-program-guide retrieval method according to claim 1, wherein when a particular genre is relevant to place names, a different genre is relevant to names of persons.

6. An electronic-program-guide retrieval system comprising:
a data server including an electronic-program-guide database storing program information of an electronic program guide;
a dictionary database for storing a plurality of retrieval keywords and a plurality of additional keywords relevant to said retrieval keywords,
wherein the dictionary database is stored in a data server whereby, by providing the dictionary database in the data server, the dictionary database is used in common, and accordingly, in a client having a small data storage capacity in a home server, a HDD recorder 400, or a PC, storage capacity is not occupied by the dictionary database, and
wherein when contents of the dictionary database are updated, maintenance of difference data does not need to be performed by the home server; and
a client terminal for:
inputting said retrieval keywords;
accessing said dictionary database as a function of said retrieval keywords and the plurality of additional keywords;
when receiving the input retrieval keyword, extracting at least one additional keyword from the dictionary database as a function of the input retrieval keyword,
wherein, when the input retrieval keyword is input, the at least one additional keyword is extracted from the dictionary database as a function of the input retrieval keyword by the extracting means,
wherein the dictionary database stores frequently misspelled words as possible misspelled words, and
wherein the at least one additional keyword may be extracted after replacing an improperly input keyword with a corrected keyword based on the stored frequently misspelled words,
wherein relevant keywords and previously used retrieval keywords are arranged in order of frequency of use increasing retrieval speed,
wherein when the input retrieval keyword is the name of a person, the dictionary database refers to a person dictionary, and extracts, as relevant keywords a reading of the person's name, a nickname or informal name, an alias, and a group to which the person belongs;
pre-designating one particular database from among a plurality of databases, including an electronic-program-guide database, a movie information database, and a drama information database,
wherein each of the plurality of databases are provided in separate data servers for distributed arrangements at different locations;
selecting a route to the particular database via a routing server comprising: a storage unit for storing information on a path to each of the plurality of databases; and an access unit for accessing each of the plurality of databases;
searching electronic-program-guide data from the one particular database that is pre-designated as a function of the input retrieval keyword and the at least one extracted additional keyword,
wherein, when the input retrieval keyword is input, relevant keywords, extracted by the dictionary database are sent to the routing server, and
wherein the routing server accesses one of the databases in a data server storing the particular database, storing desired data by selecting a route to the data server, whereby the desired data is obtained.

7. An electronic-program-guide retrieval system according to claim 6, wherein said dictionary database is provided at the client side.

8. An electronic-program-guide retrieval system according to claim 6, wherein said dictionary database is provided at the data server side.

9. An electronic-program-guide retrieval system according to claim 6, wherein said client downloads and stores the program information.

10. An electronic-program-guide retrieval system according to claim 6, wherein said client accesses a necessary part of said data server via a routing server storing information on routes to the parts of said data server.

11. An electronic-program-guide retrieval system according to claim 6, wherein previously input keywords are stored in a retrieval-keyword database, and the stored keywords are arranged in order of frequency of use.

12. An electronic-program-guide retrieval system according to claim 6, wherein the program information includes data relevant to place names.

13. An electronic-program-guide retrieval system comprising:
a data server including a plurality of databases, one of which is a television electronic-program-guide database for storing program information of an electronic program guide containing only keywords determined by an EPG provider as retrieval keywords;
a client having a certain data storage capacity comprising input means for inputting a retrieval keyword for retrieving the program information;
a dictionary database provided at the data server side and the client side for storing retrieval keywords and relevant keywords relevant to said retrieval keywords,
wherein the dictionary database is stored in a data server whereby, by providing the dictionary database in the data server, the dictionary database is used in common, and accordingly, in a client having a small data storage capacity in a home server, a HDD recorder 400, or a PC, storage capacity is not occupied by the dictionary database, and
wherein when contents of the dictionary database are updated, maintenance of difference data does not need to be performed by the home server,
a routing server having an access unit for accessing selectively said database and route information, wherein when retrieval keyword is input, and relevant-keyword information relevant to the retrieval keyword input by said client is extracted from said dictionary database provided at the client side, said client sends the relevant-keyword to said routing server and the routing server accesses one of a plurality of databases, including an electronic-program-guide database, a movie information database, and a drama information database via said routing server storing information on routes to the parts of said data server, wherein the dictionary database stores frequently misspelled words as possible misspelled words, and wherein the at least one additional keyword may be extracted after replacing an improperly input keyword with a corrected keyword based on the stored frequently misspelled words, wherein relevant keywords and previously used retrieval keywords are arranged in order of frequency of use increasing retrieval speed, wherein when the input retrieval keyword is the name of a person, the dictionary database refers to a person dictionary, and extracts, as relevant keywords a reading of the person's name, a nickname or informal name, an alias, and a group to which the person belongs; and wherein said routing server accesses the database by:

pre-designating one particular database from among a plurality of databases, including an electronic-program-guide database, a movie information database, and a drama information database, wherein each of the plurality of databases are provided in separate data servers for distributed arrangements at different locations;

selecting a route to the particular database that is pre-selected via a routing server comprising: a storage unit for storing information on a path to each of the plurality of databases; and an access unit for accessing each of the plurality of databases;

searching electronic-program-guide data from the one particular database that is pre-designated as a function of the input retrieval keyword and the at least one extracted additional keyword, wherein, when the input retrieval keyword is input, relevant keywords, extracted by the dictionary database are sent to the routing server, and wherein the routing server accesses one of the databases in a data server storing the particular database, storing desired data by selecting a route to the data server, whereby the desired data is obtained.

* * * * *